(12) United States Patent
Yamada

(10) Patent No.: US 10,988,614 B2
(45) Date of Patent: Apr. 27, 2021

(54) URETHANE COMPOSITION, POLYURETHANE ELASTOMER AND TRANSMISSION BELT

(71) Applicant: Bando Chemical Industries, Ltd., Hyogo (JP)

(72) Inventor: Mitsuru Yamada, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 0 days.

(21) Appl. No.: 15/576,509

(22) PCT Filed: May 13, 2016

(86) PCT No.: PCT/JP2016/064292
§ 371 (c)(1),
(2) Date: Nov. 22, 2017

(87) PCT Pub. No.: WO2016/190131
PCT Pub. Date: Dec. 1, 2016

(65) Prior Publication Data
US 2018/0171139 A1    Jun. 21, 2018

(30) Foreign Application Priority Data
May 26, 2015   (JP) .............................. JP2015-106544

(51) Int. Cl.
*C08L 75/04* (2006.01)
*C08K 5/11* (2006.01)
(Continued)

(52) U.S. Cl.
CPC .............. *C08L 75/04* (2013.01); *C08G 18/10* (2013.01); *C08G 18/3203* (2013.01);
(Continued)

(58) Field of Classification Search
CPC ................ C08G 18/10; C08G 18/3206; C08G 18/4804; C08G 18/485; C08G 18/4858;
(Continued)

(56) References Cited

U.S. PATENT DOCUMENTS 5,545,706 A * 8/1996 Barksby ................. C08G 18/12
528/49
2002/0049297 A1* 4/2002 Suzuki .................. C08G 18/12
528/76
(Continued)

FOREIGN PATENT DOCUMENTS

CN      104379672 A    2/2015
EP      1184397 A1     3/2002
(Continued)

OTHER PUBLICATIONS

JP-2013163778_Aug. 2013_English Translation.*
(Continued)

*Primary Examiner* — Michael L Leonard
(74) *Attorney, Agent, or Firm* — The Webb Law Firm

(57) ABSTRACT

An object is to provide a polyurethane elastomer excellent in strength and surface smoothness. To attain the object, a urethane composition including a certain prepolymer, a plasticizer and a crosslinking agent is provided.

5 Claims, 1 Drawing Sheet

(51) Int. Cl.

| | | |
|---|---|---|
| *F16G 1/28* | (2006.01) | |
| *C08G 18/10* | (2006.01) | |
| *F16G 1/08* | (2006.01) | |
| *C08G 18/66* | (2006.01) | |
| *C08G 18/48* | (2006.01) | |
| *C08L 75/08* | (2006.01) | |
| *C09D 175/08* | (2006.01) | |
| *C08G 18/76* | (2006.01) | |
| *C08G 18/78* | (2006.01) | |
| *C08G 18/32* | (2006.01) | |
| *C08K 5/053* | (2006.01) | |
| *F16G 1/14* | (2006.01) | |

(52) U.S. Cl.
CPC ..... *C08G 18/3206* (2013.01); *C08G 18/4804* (2013.01); *C08G 18/485* (2013.01); *C08G 18/4829* (2013.01); *C08G 18/4854* (2013.01); *C08G 18/4858* (2013.01); *C08G 18/6611* (2013.01); *C08G 18/6674* (2013.01); *C08G 18/6677* (2013.01); *C08G 18/7664* (2013.01); *C08G 18/7671* (2013.01); *C08G 18/7843* (2013.01); *C08K 5/053* (2013.01); *C08K 5/11* (2013.01); *C08L 75/08* (2013.01); *C09D 175/08* (2013.01); *F16G 1/08* (2013.01); *F16G 1/14* (2013.01); *F16G 1/28* (2013.01)

(58) Field of Classification Search
CPC ............ C08G 18/4829; C08G 18/6611; C08G 18/6677; C08G 18/7664; C08G 18/7843; F16G 1/08; F16G 1/14; F16G 1/28
See application file for complete search history.

(56) References Cited

U.S. PATENT DOCUMENTS

| | | | |
|---|---|---|---|
| 2011/0129647 | A1 | 6/2011 | Duke, Jr. et al. |
| 2013/0267639 | A1* | 10/2013 | Zhuang ................ C08L 75/04 524/285 |
| 2016/0264756 | A1 | 9/2016 | Fujioka |

FOREIGN PATENT DOCUMENTS

| | | | | |
|---|---|---|---|---|
| JP | 4370109 | A | | 12/1992 |
| JP | 11302352 | A | | 11/1999 |
| JP | 200268515 | A | | 3/2002 |
| JP | 2002234928 | | * | 8/2002 |
| JP | 2009210011 | A | | 9/2009 |
| JP | 2013163778 | A | * | 8/2013 |
| JP | 2013163778 | A | | 8/2013 |
| JP | 2016056876 | A | * | 4/2016 |
| WO | 2011068729 | A1 | | 6/2011 |
| WO | 2013149956 | A2 | | 10/2013 |
| WO | WO-2015084635 | A1 | * | 6/2015 ......... C08G 18/2063 |
| WO | 2015068496 | A1 | | 3/2017 |

OTHER PUBLICATIONS

JP-2002234928_Aug. 2002_English Translation.*
Szycher, Michael. Jul. 13, 2012, "Structure-Property Relations in Polyurethanes" from Szcher's Handbook of Polyurethanes. 1-51.*
JP-2016056876 to Shindo. Apr. 2016_English Translation.*

* cited by examiner

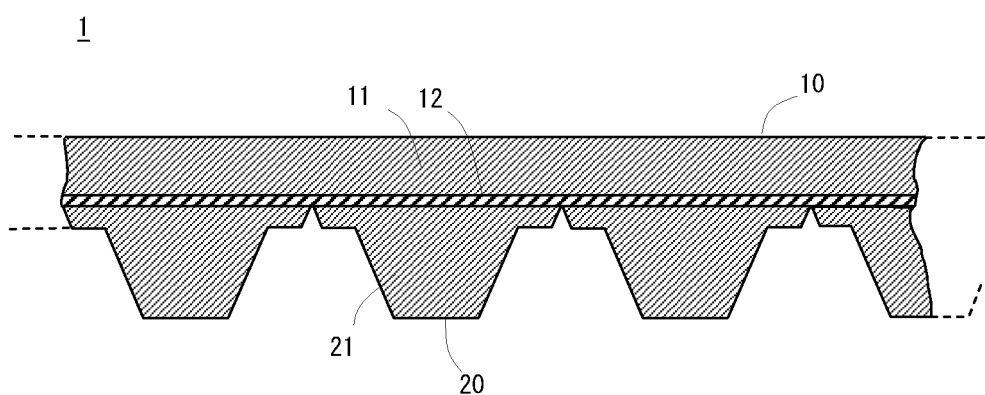

URETHANE COMPOSITION, POLYURETHANE ELASTOMER AND TRANSMISSION BELT

CROSS-REFERENCE TO RELATED APPLICATIONS

This application is the United States national phase of International Application No. PCT/JP2016/064292 filed May 13, 2016, and claims priority to Japanese Patent Application No. 2015-106544 filed May 26, 2016, the disclosures of which are hereby incorporated in their entirety by reference.

FIELD

The present invention relates to a urethane composition, a polyurethane elastomer and a transmission belt.

BACKGROUND

Conventionally, to drive rollers in printers and the copying machines, a transmission belt called a toothed belt has been used. The toothed belt has teeth protruding from one or both surfaces of a belt body. The teeth are arranged at regular intervals in the length direction of the belt body. The toothed belt is usually used in combination with a toothed pulley having grooves corresponding to the teeth. The belt body, which is an endless belt, is used by looping it over a plurality of toothed pulleys. When a roller of a printer or a copying machine is driven, a toothed pulley, which is provided to an end of the roller in a longitudinal direction, is rotated by movement of the toothed belt. In moving the toothed belt, the teeth are repeatedly taken in and out from grooves of the toothed pulley. Because of this, the teeth of the toothed belt are required to have not only excellent strength but also excellent surface smoothness (see, Patent Literature 1 described later).

CITATION LIST

Patent Literature

Patent Literature 1: JP 2009-210011 A

SUMMARY

Technical Problem

In forming a transmission belt and a conveyance belt, such as a toothed belt, various elastomers such as a polyurethane elastomer are used. In the polyurethane elastomer, physical properties thereof are easily controlled by changing the types and blend ratio of a polyol and a polyisocyanate in a urethane composition that is a material for forming the polyurethane elastomer. However, a polyurethane elastomer excellent in both strength and surface smoothness has not yet been found and a polyurethane elastomer suitable as a material for forming e.g., a transmission belt has not yet been found.

The present invention was made in consideration of these circumstances. An object of the present invention is to provide a urethane composition suitable for forming a polyurethane elastomer excellent in strength and surface smoothness, and further provide a polyurethane elastomer suitable for forming a transmission belt such as a toothed belt.

Solution to Problem

A urethane composition according to the present invention for solving the aforementioned problem is a urethane composition including a polyol and a polyisocyanate, the urethane composition including, as a main component, a urethane prepolymer that is a reaction product between a long chain polyol having a molecular weight of 300 or more and diphenylmethane diisocyanate and further including a plasticizer and a polyol crosslinking agent.

The polyurethane elastomer according to the present invention is formed of the urethane composition as mentioned above. In the transmission belt according to the present invention, the surface thereof to be in contact with a pulley is formed of such a polyurethane elastomer.

Effects

According to the present invention, there is provided a urethane composition suitable for forming a polyurethane elastomer excellent in strength and surface smoothness.

BRIEF DESCRIPTION OF THE DRAWINGS

FIG. 1 is a schematic sectional view showing a toothed belt.

DESCRIPTION OF EMBODIMENT

An embodiment of the present invention will be described. The urethane composition and the polyurethane elastomer of the present invention will be described below by taking, for example, a case where they are used for forming a toothed belt. First, a toothed belt will be described with reference to FIG. 1.

FIG. 1 is a view showing a section of a toothed belt cut in parallel with both the longitudinal direction and the thickness direction of the toothed belt. As shown in the FIGURE, a toothed belt 1 according to this embodiment has a belt body 10 having a belt shape. The toothed belt 1 has teeth 20, which protrude from one of the sides of the belt body 10.

The belt body 10 is formed of a polyurethane elastomer 11 and a tension member 12 embedded in the polyurethane elastomer. The tooth 20 is wholly formed of a polyurethane elastomer 21. The polyurethane elastomer 21 constituting the teeth 20 and the polyurethane elastomer 11 constituting the belt body 10 are formed of the same urethane composition and the toothed belt 1 of this embodiment has an integral structure of them.

The surface of the tooth 20 is a portion to be strongly in contact with a toothed pulley when the toothed belt 1 is looped over the toothed pulley. Because of this, the polyurethane elastic bodies 11 and 21 constituting these portions are required to have not only excellent strength but also excellent surface smoothness.

For the reason above, the polyurethane elastic bodies 11 and 21 preferably have a JIS A hardness of 80 or more. The hardness is more preferably 82 or more and particularly preferably 84 or more. The "JIS A hardness" of a polyurethane elastomer herein refers to an instantaneous value of durometer A hardness measured in accordance with the former JIS K6301 in the JIS standard conditions (23° C., 50% RH). The JIS A hardness of the polyurethane elastomer is preferably 100 or less.

The urethane composition of this embodiment for forming the polyurethane elastic bodies 11 and 21 includes, as a main component, a urethane prepolymer that is a reaction product of a long chain polyol having a molecular weight of 300 or more and diphenylmethane diisocyanate. More specifically, in the urethane composition of this embodiment, the mass proportion of the urethane prepolymer is the highest of the components included therein. The urethane composition of this embodiment further includes a plasticizer and a polyol crosslinking agent.

A starting material for the urethane prepolymer, i.e., the long-chain polyol, may have a molecular weight of, for example, 300 or more. The molecular weight of the starting material for the urethane prepolymer, i.e., the long-chain polyol, is preferably 650 or more and more preferably 800 or more. The molecular weight of the long chain polyol may be, for example, 3000 or less, preferably 2000 or less and more preferably 1500 or less. Examples of the long chain polyol include a polyether polyol and a polyester polyol. Examples of the polyether polyol include a polyether polyol obtained by adding an alkylene oxide to a short chain polyol having a molecular weight of less than 300. The molecular weight of a polyol, if the structure of the polyol can be specified, can be computationally obtained based on the structure. If it is difficult to specify the structure of a polyol, the molecular weight of such a polyol can be obtained by determining a number average molecular weight thereof. The number average molecular weight (Mn) of a polyol can be determined by gel permission chromatography (GPC) by using, for example, GPC: model name "HLC-8020" manufactured by Tohso Corporation; three columns, i.e., columns "G-4000", "G-3000" and "G-2000" (all were manufactured by Tohso Corporation) mutually connected; and chloroform as a mobile phase.

As the short-chain polyol, usually, a divalent polyol (diol) or a trivalent polyol (triol) can be used. The short-chain polyol may be a polyol of quadrivalent or more.

The short chain diol may be, for example, an aliphatic diol having 2 to 12 carbon atoms. As the aliphatic diol, one or two or more selected from the group consisting of e.g., ethylene glycol, diethylene glycol, 1,3-propanediol, 1,4-butanediol, 1,5-pentane diol, 1,6-hexane diol, 1,2-propylene glycol, neopentyl glycol, 3-methyl-1,5-pentane diol, 2,2-diethyl-1,3-propanediol, 1,2-butanediol, 1,3-butanediol and 2,3-butanediol, are mentioned. The short chain diol may be an alicyclic diol or an aromatic diol.

As the short chain triol, one or two or more selected from the group consisting of e.g., glycerin, trimethylolpropane and adducts of these alkylene oxides, are mentioned.

Examples of the alkylene oxide, which is used in combination with a short chain polyol as mentioned above to form a polyether polyol, include an alkylene oxide having about 2 to 10 carbon atoms.

More specifically, as the polyether polyol, one or two or more selected from the group consisting of e.g., a polyethylene glycol, a polypropylene glycol, a polyoxyethylene-polyoxypropylene glycol, a polytetramethylene ether glycol, a polyoxybutylene-polyoxyethylene glycol, a polyoxybutylene-polyoxypropylene glycol, an ethylene oxide adduct of bisphenol A and a propylene oxide adduct of bisphenol A, are mentioned.

Examples of the polyester polyol include a dehydration condensate of a short chain diol as mentioned above and a dicarboxylic acid, and a compound obtained by the ring opening reaction of a caprolactone with a short chain diol as mentioned above. As the dicarboxylic acid, one or two or more selected from the group consisting of e.g., an aliphatic dicarboxylic acid such as succinic acid, adipic acid, sebacic acid, glutaric acid, azelaic acid, maleic acid and fumaric acid; and an aromatic dicarboxylic acid such as terephthalic acid and isophthalic acid, are mentioned. As the caprolactone, one or two or more selected from the group consisting of e.g., α-caprolactone, β-caprolactone, γ-caprolactone, δ-caprolactone, ε-caprolactone, α-methyl-ε-caprolactone, β-methyl-ε-caprolactone, heptalactone, octalactone, undecalactone, pentadecalactone, γ-butyrolactone and γ-valero lactone, are mentioned.

More specifically, as the polyester polyol, one or two or more selected from the group consisting of e.g., polyethylene adipate diol, polybutylene adipate diol, polyhexamethylene adipate diol, polybutylene isophthalate diol, polyhexamethylene isophthalate diol, polyneopentyl adipate diol, polyethylene propylene adipate diol, polyethylene butylene adipate diol, polybutylene hexamethylene adipate diol, poly(polytetramethylene ether)adipate diol, poly(diethylene glycol)isophthalate diol, polycaprolactone diol, adipic acid-modified polycaprolactone diol, terephthalic acid-modified polycaprolactone diol and isophthalic acid-modified polycaprolactone diol, are mentioned.

The polyol of this embodiment is preferably a polyether polyol and more preferably a polytetramethylene ether glycol.

The urethane composition of this embodiment includes, as a main component, a prepolymer obtained by reacting a long chain polyol and a diphenylmethane diisocyanate, and may include another type of polyisocyanate if the content is low (for example, 5 mass % or less of the total content of polyisocyanates). As diphenylmethane diisocyanate as an essential component of the urethane composition, one or two or more selected from the group consisting of e.g., a monomeric MDI such as 4,4'-diphenylmethane diisocyanate (4,4'-MDI), 2,2'-diphenylmethane diisocyanate (2,2'-MDI) and 2,4'-diphenylmethane diisocyanate (2,4'-MDI); and a polymeric MDI such as polymethylene polyphenylene polyisocyanate, are mentioned. Of them, 4,4'-diphenylmethane diisocyanate (4,4'-MDI) is preferable as the diphenylmethane diisocyanate. The urethane composition of this embodiment includes, as the polyisocyanate other than diphenylmethane diisocyanate, one or two or more selected from the group consisting of, e.g., an aromatic polyisocyanate such as 2,4-tolylene diisocyanate (2,4-TDI), 2,6-tolylene diisocyanate (2,6-TDI), 1,4-phenylene diisocyanate, tolidine diisocyanate (TODI) and 1,5-naphthalene diisocyanate (NDI); an aliphatic polyisocyanate such as hexamethylene diisocyanate (HDI), trimethylhexamethylene diisocyanate (TMHDI), lysine diisocyanate, norbornene diisocyanate methyl (NBDI), xylylene diisocyanate (XDI) and tetramethylxylylene diisocyanate (TMXDI); an alicyclic polyisocyanates such as transcyclohexane-1,4-diisocyanate, isophorone diisocyanate (IPDI); and H6XDI (hydrogenated XDI) and H12MDI(hydrogenated MDI); and carbodiimide-modified polyisocyanates of the individual polyisocyanates mentioned above, or isocyanurate-modified polyisocyanates of these.

As the plasticizer, a plasticizer which is conventionally used for the purpose of controlling e.g., the hardness of a polyurethane elastomer can be suitably used. As the plasticizer, one or two or more selected from the group consisting of, e.g., aliphatic dibasic acid esters, phthalate esters, glycol esters, fatty acid esters and phosphate esters, are mentioned.

As the aliphatic dibasic acid ester, one or two or more selected from the group consisting of, e.g., adipic acid esters such as dioctyl adipate and diisodecyl adipate, are mentioned. As the aliphatic dibasic acid ester, diisodecyl succinate, dioctyl azelate, dibutyl sebacate, dioctyl sebacate and dioctyl tetrahydrophthalate are mentioned. As the glycol ester, one or two or more selected from the group consisting of e.g., diethylene glycol dibenzoate, dipentaerythritol hexaester, and pentaerythritol ester, are mentioned.

As the phthalate ester, one or two or more selected from the group consisting of, e.g., dimethyl phthalate, diethyl phthalate, diisobutyl phthalate, dibutyl phthalate, diheptyl phthalate, di-2-ethylhexyl phthalate, diisooctyl phthalate, di-n-octyl phthalate, dinonyl phthalate, diisodecyl phthalate, ditridecyl phthalate and dicyclohexyl phthalate, are mentioned.

As the fatty acid ester, one or two or more selected from the group consisting of, e.g., butyl oleate, methyl acetylricinoleate, methyl chlorinated fatty acid and methyl methoxy chlorinated fatty acid, are mentioned.

As the phosphate ester, one or two or more selected from the group consisting of, e.g., tricresyl phosphate, trioctyl phosphate, octyl diphenyl phosphate, triphenyl phosphate, trichloroethylphosphate and cresyl diphenyl phosphate, are mentioned.

Of these, aliphatic dibasic acid esters are preferable as the plasticizer of this embodiment and an adipate ester is more preferable. As the plasticizer, dioctyl adipate (DOA (bis(2-ethylhexyl) adipate: DEHA)) is particularly preferable.

As the polyol crosslinking agent, a short-chain polyol as mentioned above can be employed. As the polyol crosslinking agent, a combination of a short-chain polyol as mentioned above and a long chain polyol as mentioned above is preferable.

The short-chain polyol to be used as a crosslinking agent is preferably one or more selected from the group consisting of a short chain diol and trimethylolpropane. The long chain polyol to be used as a crosslinking agent is preferably the same type of polyol as that constituting a urethane prepolymer, and a polyether polyol is preferable. In particular, polytetramethylene ether glycol is preferable as the long chain polyol.

The urethane composition of this embodiment includes a plasticizer as mentioned above in a proportion of preferably 10 mass % or more and more preferably 12.5 mass % or more. The urethane composition includes the plasticizer in a proportion of preferably less than 20 mass %, more preferably 17.5 mass % or less and particularly preferably 15 mass % or less.

The urethane composition of this embodiment preferably includes a short chain polyol that is the polyol crosslinking agent in a proportion of 10 parts by mass or more, provided that the content of the urethane prepolymer is 100 parts by mass. The urethane composition of this embodiment preferably includes a short chain polyol that is the polyol crosslinking agent, in a proportion of 20 parts by mass or less, provided that the content of the urethane prepolymer is 100 parts by mass.

The urethane composition of this embodiment preferably includes a long chain polyol that is the polyol crosslinking agent, in a proportion of 50 parts by mass or more, provided that the content of the urethane prepolymer is 100 parts by mass. The urethane composition of this embodiment preferably includes a long chain polyol serving as the polyol crosslinking agent, in a proportion of 75 parts by mass or less, provided that the content of the urethane prepolymer is 100 parts by mass.

For the urethane composition of this embodiment, it is preferable that a "NCO rate (Z)" represented by the following expression (1) satisfy the following conditions specified by the following inequality expression (2):

$$Z(\text{NCO rate:}\%)=[42.02 \times X/(Y/100)] \times 100 \quad (1)$$

$$8.5 \leq Z \leq 10 \quad (2)$$

wherein the number of isocyanate groups included therein is represented by X (mol/g); the molecular weight of the isocyanate group is 42.02 (g/mol); and the total content of all long chain polyols and a polyisocyanate (including the long chain polyol and polyisocyanate forming a urethane prepolymer) included in the urethane composition is represented by Y (mass %).

The "NCO rate (Z)" is more preferably 9.0 mass % or more. The "NCO rate (Z)" is more preferably 9.5 mass or less. The number (X) of isocyanate groups in the urethane composition do not include the number of isocyanate groups which participate, together with hydroxyl groups of a long chain polyol, in formation of urethane bonds in the urethane prepolymer.

The "NCO rate" represented by the above expression (1) refers to the amount of a hard segment occupied in the total of a soft segment constituted of a long chain polyol in a polyurethane elastomer and a hard segment constituted of a polyisocyanate. Since the isocyanate group is principally introduced into the urethane composition by diphenylmethane diisocyanate, the "NCO rate" represents the amount of a diphenyl structure present in the urethane composition. Since the urethane composition includes a rigid diphenyl structure in a predetermined proportion, the polyurethane elastomer excellent in strength and surface smoothness can be obtained. Since the urethane composition includes a plasticizer in the aforementioned proportion, the polyurethane elastomer having excellent surface smoothness and appropriate flexibility can be obtained.

The urethane composition of this embodiment may further include other additives, if necessary. Examples of the additives include an inorganic filler, a bulking agent such as a short fiber, a functional chemical agent such as a flame retardant, an antimicrobial agent, a coupling agent, an antioxidant, an anti-aging agent and a UV absorber, and a colorant.

The tension member 12 constituting the belt body of the toothed belt, in combination with a polyurethane elastomer formed of the urethane composition, is not particularly limited, and for example, a cord made of a glass fiber, an inorganic cord such as a steel cord, and a polymer cord such as a polyester cord, a polyketone cord and a polyamide cord, can be employed.

The toothed belt 1 of this embodiment can be produced by a production method usually employed, except that the aforementioned materials are used for forming the polyurethane elastic bodies 11 and 21. A process for forming the toothed belt 1 will be described below. First, a columnar or cylindrical inner mold is prepared. The inner mold has, for example, grooves extending in the shaft direction and arranged at regular intervals in the outer peripheral surface. On the tips of the protrusions formed between grooves, ridges for supporting the tension member are formed and extended in the shaft direction. Then, a cord serving as the tension member 12 is spirally wound around the outer periphery of the inner mold to obtain the cord arranged at predetermined intervals in the shaft direction. The inner mold wound by the cord is placed in an outer mold having an inner diameter which is larger just by a thickness of the belt body than the outer diameter of the inner mold. Then, a urethane composition as mentioned above is prepared and poured in the space between the inner mold and the outer mold. The urethane composition is heated to allow a crosslinking agent, a long chain polyol and a urethane prepolymer to react. Through the reaction, a polyurethane elastomer is formed in a mold to produce a tubular compact. The tubular compact is cut into pieces at a predetermined width to obtain the toothed belts shown in FIG. 1.

The toothed belt produced as described above is also excellent in abrasion resistance, since the teeth and belt body are formed of a polyurethane elastomer excellent in strength and surface smoothness. This embodiment shows a case where a urethane composition is used as a material for forming the toothed belt; however, the urethane composition, polyurethane elastomer and transmission belt according to the present invention are not limited to those of the case. The urethane composition of the present invention can be used, for example, in a transmission belt other than the toothed belt and is also useful as a material for forming e.g., a conveyance belt other than a transmission belt. The urethane composition of the present invention can be used for applications other than belts. The urethane composition of the present invention is suitable as a material for forming a member which is used in sliding contact with other members, other than belts. As described above, the present invention is not particularly limited to the above examples.

EXAMPLES

The present invention will be more specifically described by way of Examples below; however, the present invention is not limited to these examples.

(Physical Property Evaluation 1: Physical Properties of Sheet)

(Urethane Compositions #1 to #7)

Polytetramethylene ether glycol (PTMG: molecular weight: about 1000) and 4,4'-diphenylmethane diisocyanate (MDI) were reacted to prepare a urethane prepolymer (the content of an isocyanate group: 20.1 mass %) (hereinafter also referred to as "Solution A") that is a reaction product. Separately from Solution A, a solution (hereinafter also referred to as "Solution B") including a crosslinking agent (1,4 butanediol: molecular weight: about 90 and PTMG: molecular weight: about 1000) and a plasticizer (bis(2-ethylhexyl) adipate) was prepared in accordance with the formulation shown in Table 1.

Solution A was defoamed, heated to 50° C., mixed with Solution B also preheated to 50° C. in accordance with the ratio shown in the following Table 1 and stirred. In this manner, urethane compositions #1 to #7 were prepared. To a mold having a spacer of 2 mm in thickness sandwiched between two flat plates, a urethane composition was injected and then heated in an oven of 100° C. to allow the prepolymer to crosslink. In this manner, a sheet formed of a polyurethane elastomer and having a thickness of 2 mm for evaluation of physical properties was obtained. The physical property evaluation sheet was subjected to measurements of JIS A hardness and dynamic friction coefficient; at the same time, bleed out of a plasticizer was visually observed.

The dynamic friction coefficient was determined in accordance with the following procedure. First, the evaluation sheet was cut into pieces of 5-mm squares to prepare cut pieces. One of the cut pieces was immobilized to a jig and brought into contact with the surface of a disk, which was made of an FC material (gray cast iron) and constantly rotated at a rotation speed of 48 rpm. The cut piece was brought into contact with the surface of the disk such that the surface (5 mm×5 mm) of the cut piece faced the disk surface. A load was applied to the jig so as to apply pressure between the cut piece and the disk surface. Then, the frictional force generated between the cut piece immobilized and the rotating disk was measured. From the frictional force, dynamic friction coefficient was computationally obtained. The dynamic friction coefficients of the cut pieces prepared from individual urethane compositions #1 to #7 were determined in common conditions, more specifically, by applying the same load to a cut piece, immobilizing a cut piece at the same position of the disk (rotating the disk at the same circumferential velocity) and by setting the same time period from initiation of contact between a cut piece and the disk to measurement of frictional force. The results are shown in Table 1 below. The dynamic friction coefficient determined in this manner was preferably less than 0.3 and more preferably less than 0.27. The measurement of "hardness" and "dynamic friction coefficient" of "#7 evaluation sheet" was not carried out.

TABLE 1

| Urethane composition | | #1 | #2 | #3 | #4 | #5 | #6 | #7 |
|---|---|---|---|---|---|---|---|---|
| Solution A | Prepolymer | 100 | 100 | 100 | 100 | 100 | 100 | 100 |
| Solution B | PTMG | 63 | 63 | 63 | 63 | 63 | 63 | 63 |
| | 1,4-butanediol | 15 | 15 | 15 | 15 | 15 | 15 | 15 |
| | bis(2-ethylhexyl) adipate | 31 | 25 | 38 | 20 | 45 | 9 | 59 |
| Additive amount of plasticizer [mass %] | | 15 | 12.5 | 17.5 | 10 | 20 | 5 | 25 |
| NCO rate [mass %] | | 9 | 9 | 9 | 9 | 9 | 9 | 9 |
| Physical property evaluation | Hardness [JIS-A] | 84.4 | 85.4 | 82.9 | 87.0 | 81.2 | 88.4 | — |
| | Dynamic friction coefficient | 0.19 | 0.29 | 0.27 | 0.33 | 0.30 | 0.99 | — |
| | Bleed out | Absent | Absent | Slightly present | Absent | Present | Absent | Present |

(Physical Property Evaluation 2: Physical Properties of Sheet and Solution Stability)

A urethane composition (including a plasticizer in an amount of 10 to 20 mass % and an NCO rate of 7.5 to 10 mass %) was prepared by using the same "prepolymer (Solution A)" as in "physical-property evaluation 1" and changing the composition ratio of "Solution B" and the blending ratio of "Solution A" and "Solution B". A physical-property evaluation sheet was prepared in the same manner as in "physical property evaluation 1" and subjected to evaluation of "hardness", "dynamic friction coefficient" and "bleed out". It is preferable that "Solution A" and "Solution B" are excellent in storage stability in order to efficiently prepare a polyurethane elastomer excellent in strength and surface smoothness. Then, preferable conditions for carrying out the present invention in view of "solution stability", were also evaluated. To describe it more specifically, "Solution B" was heated to 50° C. and the separation state of the solution was visually observed. These results are shown in Tables 2 to 5 below. Symbol "-" in the tables represents that evaluation was not made.

TABLE 2

| Hardness [JIS-A] | Additive amount of plasticizer [mass %] | | | | |
| --- | --- | --- | --- | --- | --- |
| | 10 | 12.5 | 15 | 17.5 | 20 |
| NCO rate [mass %] 10 | 88.3 | 86.4 | 86.0 | 83.1 | — |
| 9.5 | 87.2 | 85.2 | 84.7 | 83.0 | 81.7 |
| 9.0 | 87.0 | 85.4 | 84.4 | 82.9 | 81.2 |
| 8.5 | 84.8 | 82.7 | 81.2 | 80.9 | 79.5 |
| 8.0 | 82.6 | 81.4 | 80.3 | 79.6 | 78.7 |
| 7.5 | 81.8 | 80.3 | — | 77.6 | — |

TABLE 3

| Dynamic friction | Additive amount of plasticizer [mass %] | | | | |
| --- | --- | --- | --- | --- | --- |
| coefficient [—] | 10 | 12.5 | 15 | 17.5 | 20 |
| NCO rate [mass %] 10 | 0.21 | 0.23 | 0.29 | — | — |
| 9.5 | 0.20 | 0.24 | 0.27 | — | — |
| 9.0 | 0.33 | 0.29 | 0.19 | 0.27 | 0.30 |
| 8.5 | 0.30 | 0.29 | 0.17 | 0.15 | — |
| 8.0 | 0.38 | 0.35 | 0.58 | 0.18 | — |
| 7.5 | — | — | — | — | — |

TABLE 4

| Bleed out | Additive amount of plasticizer [mass %] | | | | |
| --- | --- | --- | --- | --- | --- |
| | 10 | 12.5 | 15 | 17.5 | 20 |
| NCO rate [mass %] 10 | ○: Absent | ○: Absent | ○: Absent | X: Present | — |
| 9.5 | ○: Absent | ○: Absent | ○: Absent | X: Present | X: Present |
| 9.0 | ○: Absent | ○: Absent | ○: Absent | Δ: Slightly present | X: Present |
| 8.5 | ○: Absent | ○: Absent | ○: Absent | ○: Absent | X: Present |
| 8.0 | ○: Absent | ○: Absent | ○: Absent | ○: Absent | X: Present |
| 7.5 | ○: Absent | ○: Absent | — | ○: Absent | — |

TABLE 5

| Solution stability | Additive amount of plasticizer [mass %] | | | | |
| --- | --- | --- | --- | --- | --- |
| | 10 | 12.5 | 15 | 17.5 | 20 |
| —CO rate [mass %] 10 | X: Separation | X: separation | X: Separation | — | — |
| 9.5 | ○: Transparent | Δ: Slightly cloudy | X: Separation | — | — |
| 9.0 | ○: Transparent | ○: Transparent | Δ: Slightly cloudy | — | — |
| 8.5 | ○: Transparent | ○: Transparent | — | — | — |
| 8.0 | — | — | — | — | — |
| 7.5 | — | — | — | — | — |

(Evaluation of Belt: Durability Test of Belt)

An inner mold, which has grooves corresponding to teeth of a toothed belt and extending in the shaft direction in the outer peripheral surface and has projections extending in the shaft direction on the surfaces of individual protrusions each formed between grooves, was prepared. A cord made of a glass fiber to which an adhesion treatment was previously applied was wound around the outer peripheral surface of the inner mold. The cord was wound along the outer peripheral surface of the inner mold while being supported by the above projections. The inner mold was placed in a cylindrical outer mold and these inner and outer molds were preheated to 50° C. Subsequently, urethane composition #1 shown in Table 1 was prepared, poured into the space between the inner mold and outer mold, and then, heated in an oven of 120° C. for 90 minutes. In this manner, the prepolymer was crosslinked and cured. The resultant cylindrical compact was taken out from the molds, cut into pieces having a width of 3 mm to obtain toothed belts. The toothed belt was looped over a drive pulley having 32 teeth (32T) and an idler pulley. A tension of 2.45 N was applied to the idler pulley and the drive pulley was driven at a rate of 2345 rpm. In this manner, a two-axis durability test was carried out (specific conditions are as shown in Table 6). As a result, even if a durability test was carried out for 500 hours, no failure took place. It was found that the toothed belt subjected to evaluation is excellent in surface smoothness.

TABLE 6

| Pulley type | S1M |
| --- | --- |
| Number of teeth of drive pulley | 32 teeth |
| Number of teeth of idler pulley | Type S1M, 32 teeth |
| Number of drive rotations | 2345 rpm (rotation in one direction) |
| Torque of driven shaft | 2.45 ± 0.3N |
| Tension Load 2To (SW) | 10N (0.98 kgf) |
| Size of test belt | Peripheral length: 255, Width: 3 mm |

As mentioned above, it is found that the urethane composition according to the present invention can provide a polyurethane elastomer excellent in strength and surface smoothness and provide a polyurethane elastomer suitable as a material for forming a transmission belt such as a toothed belt.

REFERENCE SIGNS LIST

1 Toothed conveyor
10 Belt body
11 Polyurethane elastomer
12 Tension member
20 Tooth
21 Polyurethane elastomer

The invention claimed is:

1. A transmission belt, wherein the belt is used in looping over a pulley and at least a surface thereof to be in contact with the pulley is formed of a polyurethane elastomer, wherein the polyurethane elastomer is formed of a urethane composition comprising a urethane prepolymer, which is a reaction product between a long chain polyol having a number average molecular weight of 300 or more and diphenylmethane diisocyanate, as a main component and further comprising a plasticizer and a polyol crosslinking agent, wherein the long chain polyol is a polyether polyol, wherein the polyol crosslinking agent comprises a long chain polyol having a number average molecular weight of 650 or more, wherein a mass proportion of an isocyanate group occupied in a total mass of the polyether polyol, the long chain polyol having a number average molecular weight of 300 or more that can be included in the polyol crosslinking agent, and the diphenylmethane diisocyanate is 8.5 mass % or more and 10 mass % or less.

2. The transmission belt according to claim 1, wherein the belt is constituted as a toothed belt having teeth on at least one surface of a belt body and the teeth are formed of the polyurethane elastomer.

3. The transmission belt according to claim 1, wherein a content of the plasticizer based on the entire mass of the urethane composition is 10 mass % or more and less than 20 mass %, and the composition comprises an adipate ester plasticizer as the plasticizer.

4. The transmission belt according to claim 1, wherein the polyol crosslinking agent comprises one or more selected from the group consisting of a short chain diol having a number average molecular weight of less than 300 and trimethylolpropane.

5. The transmission belt according to claim 1, having a JIS A hardness of 80 or more.

\* \* \* \* \*

UNITED STATES PATENT AND TRADEMARK OFFICE
CERTIFICATE OF CORRECTION

PATENT NO. : 10,988,614 B2
APPLICATION NO. : 15/576509
DATED : April 27, 2021
INVENTOR(S) : Mitsuru Yamada Page 1 of 1

It is certified that error appears in the above-identified patent and that said Letters Patent is hereby corrected as shown below:

In the Specification

Column 1, Line 11, delete "2016," and insert -- 2015, --

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*